US006626042B2

(12) United States Patent
Havlena

(10) Patent No.: US 6,626,042 B2
(45) Date of Patent: Sep. 30, 2003

(54) COMMUNICATION FOR WATER DISTRIBUTION NETWORKS

(75) Inventor: Vladimir Havlena, Prague (CZ)

(73) Assignee: Honeywell International Inc., Morristown, NJ (US)

( * ) Notice: Subject to any disclaimer, the term of this patent is extended or adjusted under 35 U.S.C. 154(b) by 0 days.

(21) Appl. No.: 09/881,282

(22) Filed: Jun. 14, 2001

(65) Prior Publication Data

US 2002/0189362 A1 Dec. 19, 2002

(51) Int. Cl.$^7$ .............................................. G01L 11/00
(52) U.S. Cl. .............................. 73/702; 73/703; 73/587; 73/624; 367/81
(58) Field of Search .......................... 73/700–756, 587, 73/591, 624, 625; 367/81, 82, 83

(56) References Cited

U.S. PATENT DOCUMENTS

| | | | |
|---|---|---|---|
| 4,827,395 A | 5/1989 | Anders et al. | |
| 5,144,839 A | 9/1992 | Lochner | |
| 5,333,501 A | * 8/1994 | Okada et al. | ............ 73/40.5 A |
| 5,416,724 A | 5/1995 | Savic | |
| 5,502,652 A | 3/1996 | Hoggatt et al. | |
| 5,623,421 A | 4/1997 | Savic | |
| 5,708,195 A | 1/1998 | Kurisu | |
| 5,757,664 A | 5/1998 | Rogers et al. | |
| 5,995,449 A | * 11/1999 | Green et al. | ................ 367/83 |
| 6,082,193 A | 7/2000 | Paulson | |
| 6,310,829 B1 | * 10/2001 | Green et al. | ................ 367/82 |
| 6,366,675 B1 | * 4/2002 | Toda | ........................ 381/56 |
| 2001/0043509 A1 | * 11/2001 | Green et al. | ................ 367/81 |
| 2002/0039328 A1 | * 4/2002 | Dubinsky et al. | ............ 367/82 |

FOREIGN PATENT DOCUMENTS

| | | |
|---|---|---|
| DE | 2938734 A | 3/1981 |
| DE | 4037600 A | 6/1992 |
| DE | 4207068 A | 9/1993 |
| EP | 0661526 A | 7/1997 |

* cited by examiner

Primary Examiner—Edward Lefkowitz
Assistant Examiner—Andre Allen
(74) Attorney, Agent, or Firm—Kris T. Fredrick

(57) ABSTRACT

A system for monitoring the flow of a fluid such as water in a pipe, including a remote pressure sensor operably connected to the pipe for sensing the pressure of the fluid at the location of the pressure sensor. An acoustic transmitter is placed proximate the remote pressure sensor for transmitting the output of the sensors by an acoustic signal transmitted through the fluid in the pipe to an acoustic receiver that generates a control signal in response thereto control a pressure control valve for adjusting the pressure in the pipe in response. The system is intended for a water distribution networks that include a plurality of pipes, with a remote pressure sensor, transmitter, receiver and control device for at least some of the plurality of pipes.

18 Claims, 1 Drawing Sheet

COMMUNICATION FOR WATER DISTRIBUTION NETWORKS

FIELD OF THE INVENTION

The present invention relates to a method of controlling advanced water distribution networks for pressure zones, pressure modulation and such. More particularly the invention relates to the use of acoustic wave propagation through the medium itself to eliminate the additional costs of communication between sensors and controllers.

BACKGROUND OF THE INVENTION

Control of processes is a broad general concern for every industry, particularly where fluids such as water are distributed in a network of pipes, vessels, containers and tanks. Often it is necessary to know conditions at various remote locations in a process in order to control the overall operation effectiveness and efficiency of production.

One particular industry that requires significant control and which presently does not have adequate abilities for this goal is the water distribution networks that bring potable water from water supply sources and water treatment plants providing these water supply sources. It is well recognized that interruption of fluid flow in systems such as water supply systems needs to be minimized to identify and repair any interruption, such as by a pipe rupture or puncture, or by blockage of the line of flow.

Systems have been developed, such as in Kurisu et al U.S. Pat. No. 5,708,195, which relates to pipeline breakage, where individual sensors identify a leak location while being interconnected to neighboring pressure sensors, such that a leak detector sounds an alarm in the control and management center.

In addition to pressure sensors, acoustic sensors have been proposed for water supply systems. Savic U.S. Pat. No. 5,416,724 distinguishes between acoustic signals originating from leaks and signals from ambient acoustic signals. His related patent U.S. Pat. No. 5,623,421 selectively identifies specific spectral lines from generally expected spectra. Sound generated by a leak is propagated through the metal walls of the pipe and through the substance flowing through the pipe. The sound is introduced into a digital processing and pattern recognition device to detect and alert the user of the presence of leaks. Acoustic sensors are placed at a plurality of locations in the system and provide a signal in response to the sounds sensed by the sensor for processing.

With a large number of sensors, it is necessary to evaluate all of the myriad of data to determine what is true and what is false with respect to a possible leak Rogers et al U.S. Pat. No. 5,757,664 uses a computer system to eliminate presumptions as to the accuracy of the measurement apparatus. Primary in this system is the use of data only for precision and calibration accuracy.

One other system has been proposed, by Paulson U.S. Pat. No. 6,082,193, which uses an array of acoustic sensors along a cable deployed in a fluid filled concrete pipeline to monitor reinforcing wire in the concrete. The use of a separate cable of sensors is not practical in many water supply systems because of the branching and divisions of pipe lines to individual locations.

Accordingly, it would be of great advantage in the art if devices could be used to monitor a water distribution network and relay information between the sensing and control elements of the system without the expense of complicated transmission devices.

It would be another great advance in the art if an acoustic communication support could be implemented as an integral part of controllers using appropriate software currently in use.

Other advantages will appear hereinafter.

SUMMARY OF THE INVENTION

It has now been discovered that the above and other objects of the present invention may be accomplished in the following manner. Specifically, the present invention provides a system in which the outlet pressure of a pressure reducing valve in a fluid flow system is controlled by a master controller based on direct measurement of pressure at various places in the system to provide the desired pressure at those various places in the system.

The system of this invention includes a plurality of remote pressure sensors, an acoustic transmitter adapted to transmit a signal in relationship to the measured pressure via the medium, such as water, directly to an acoustic receiver. The receiver then provides the measured remote pressure to the master controller that defines the set point for the pressure reducing valve based on the pressure at the remote location, to effectively achieve real time control of the pressure at the remote location.

BRIEF DESCRIPTION OF THE DRAWINGS

For a more complete understanding of the invention, reference is hereby made to the drawings, in which:

The FIGURE is a schematic view of the preferred embodiment of the present invention, used in a water distribution network

DETAILED DESCRIPTION OF THE PREFERRED EMBODIMENT

Figure 1:
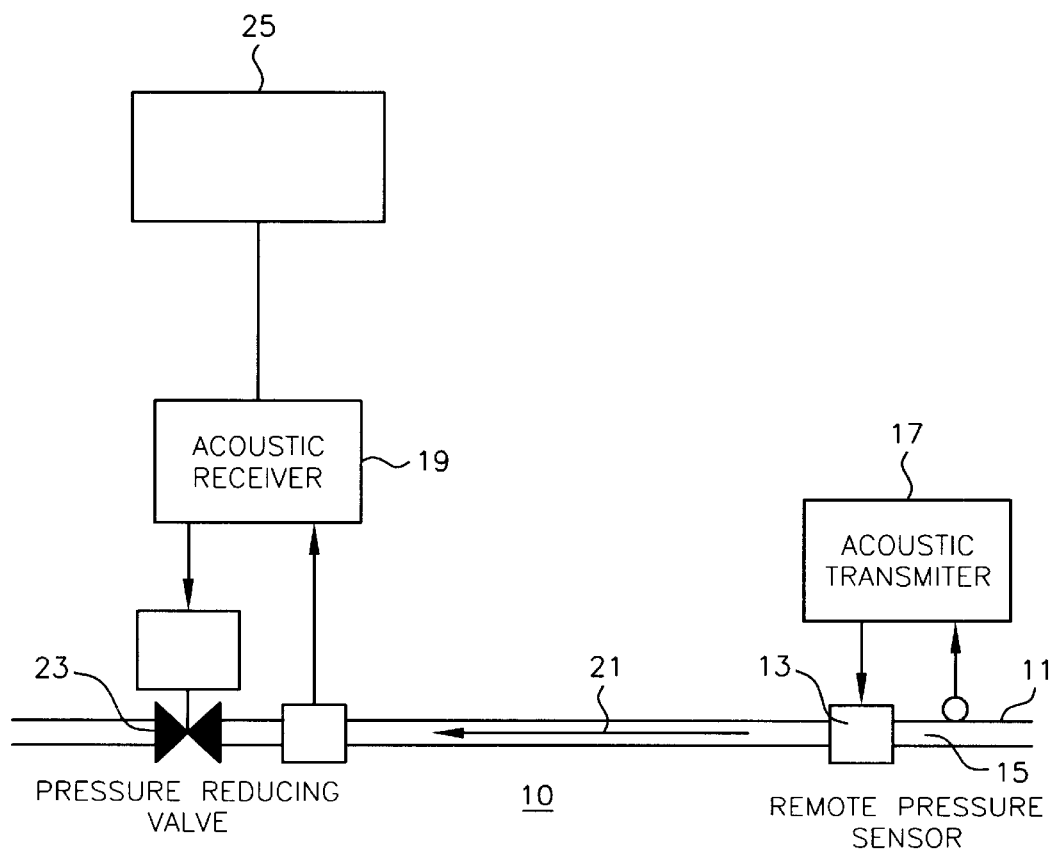

As shown in the FIGURE, the system, 10 generally, comprises a plurality of pipes 11, with one pipe 11 shown for simplicity. A pressure sensor 13 measures the pressure at a specific location 15, and generates a signal in response to that pressure to an acoustic transmitter 17. Transmitter 17 then transmits an acoustic signal along pipe 11 to an acoustic receiver 19, which in turn converts the sound wave into information about the remote pressure 21 that is used by the master pressure controller 25 to define the setpoint for the slave controller that controls the pressure reducing valve 23.

Internally, the pressure controller receives the measured, compares with setpoint for the remote pressure, and defines the outlet pressure for the pressure reducing valve 23 to reduce the difference between the measured pressure and its set point. The slave controller compares the measured outlet pressure at the pressure reduce valve 23 outlet with the set point and open/close the valve to follow this set point. The internal operation is a standard cascade connection of master and slave controllers and is available from a plurality of manufacturers.

The pressure reducing valve 23 is continuously adjusted by the controller and it outlet pressure set point is modified every time a signal is sent along pipe 11 by transmitter 17, so that the only time lag between control and change in pressure, for example by change in demand for the use of the water at that location, is the speed of sound, i.e., the acoustic signal speed, in water or whatever the fluid medium is that is being monitored.

In one system, a flow velocity of water in a water distribution network was one meter per second (m/s). The pipeline have circular cross sections ranging form 0.08 to 0.3 meters. The Reynolds number of between $8\times10^4$ and $3\times10^5$ indicate that the flow is turbulent.

For reliable communication between sensor 13 and valve 23, only plane sound waves are propagated in pipe 11. A transverse wave is excited for a wavelength less than 1.7 times the diameter. Therefore, for a typical pipeline diameter D between 0.08 and 0.3 meters, the maximum frequency is 11 to 3 kHz. In this range, standard modem technology for telephone data transfer can be employed.

It has been found that attenuation by dissipation is not a problem for the present invention.

In order to avoid the effect of turbulence on the signal to noise ration, as well as the effect of acoustic discontinuities from diameter change, valves, fittings and the like that result in signal reflection, the signal is pulsed to provide a plurality of signals over a period of time that will cancel out those discontinuities.

The present invention is admirably suited for use in advanced distribution network controls where pressure zone control, pressure modulation and the like are employed because it eliminates the significant if not prohibitive cost of high price communication infrastructure. The present invention also permits the use of more control over wider ranges since the data is now rapidly available, at the speed of sound in water for obtaining the data, to adjust the control element, such as the pressure reducing valve as shown above.

While particular embodiments of the present invention have been illustrated and described, it is not intended to limit the invention, except as defined by the following claims.

What is claimed is:

1. A system for monitoring the flow of a fluid in a pipe, comprising:
   a remote pressure sensor operably connected to said pipe for sensing the pressure of said fluid at the location of said pressure sensor;
   an acoustic transmitter operably connected to said remote pressure sensor and said pipe for transmitting the remote pressure sensor measurement output of said sensor by an acoustic signal transmitted through the fluid in said pipe;
   an acoustic receiver operably connected to said pipe for receiving said acoustic signal transmitted in said fluid and generating a control signal in response thereto; and
   a pressure control valve operably connected to said pipe for adjusting the pressure in said pipe in response to said control signal based on the remote pressure sensor measurement from said acoustic receiver.

2. The system of claim 1, wherein said fluid is water.

3. The system of claim 1, wherein said pipe is in a water distribution network.

4. The system of claim 3, wherein said water distribution network includes a plurality of pipes, and said system provides a remote pressure sensor for at least some of said plurality of pipes, and each remote pressure sensor includes a separate acoustic transmitter for transmitting an acoustic signal through the specific pipe for which said remote pressure sensor has been provided, said network including an acoustic receiver for each of said acoustic transmitters.

5. The system of claim 4, wherein said pipe has turbulent flow and said acoustic signal has a wavelength less than 1.7 times the diameter of said pipe.

6. The system of claim 5, wherein said diameter is between 0.08 and 0.3 meters.

7. A system for monitoring the flow of a fluid in a pipe, comprising:
   remote pressure sensor means operably connected to said pipe for sensing the pressure of said fluid at the location of said pressure sensor means;
   acoustic transmitter means operably connected to said remote pressure sensor means and said pipe for transmitting the output of said sensor means by an acoustic signal transmitted through the fluid in said pipe;
   acoustic receiver means operably connected to said pipe for receiving said acoustic signal transmitted in said fluid and generating a control signal in response thereto; and
   pressure control valve means operably connected to said pipe for adjusting the pressure in said pipe in response to said control signal from said acoustic receiver means.

8. The system of claim 7, wherein said fluid is water.

9. The system of claim 7, wherein said pipe is in a water distribution network.

10. The system of claim 9, wherein said water distribution network includes a plurality of pipes, and said system provides a remote pressure sensor means for at least some of said plurality of pipes, and each remote pressure sensor means includes a separate acoustic transmitter means for transmitting an acoustic signal through the specific pipe for which said remote pressure sensor means has been provided, said network including an acoustic receiver means for each of said acoustic transmitters.

11. The system of claim 10, wherein said pipe has turbulent flow and said acoustic signal has a wavelength less than 1.7 times the diameter of said pipe.

12. The system of claim 11, wherein said diameter is between 0.08 and 0.3 meters.

13. A method of monitoring the flow of a fluid in a pipe, comprising:
   sensing the pressure of said fluid at a remote location;
   transmitting the output of said sensor by an acoustic signal transmitted through the fluid in said pipe;
   receiving said acoustic signal transmitted in said fluid and generating a control signal in response thereto; and
   adjusting the pressure in said pipe in response to said control signal from said acoustic receiver.

14. The method of claim 13, wherein said fluid is water and said acoustic signal is transmitted though said water in said pipe.

15. The method of claim 13, wherein the pressure in said pipe is sensed in a water distribution network.

16. The method of claim 15, wherein said water distribution network includes a plurality of pipes, and said sensor senses pressure for at least some of said plurality of pipes, and each remote pressure is transmitted by an acoustic signal through the specific pipe for which said remote pressure has been sensed, said network receiving each of said acoustic signals for controlling the sensed pressure.

17. The method of claim 16, wherein said pipe has turbulent flow and said transmitted acoustic signal is transmitted with a wavelength less than 1.7 times the diameter of said pipe.

18. The method of claim 17, wherein said signal is transmitted in a pipe having a diameter between 0.08 and 0.3 meters.

* * * * *